(12) United States Patent
Kundu

(10) Patent No.: US 11,889,222 B2
(45) Date of Patent: Jan. 30, 2024

(54) MULTILAYER THREE-DIMENSIONAL PRESENTATION

(71) Applicant: Malay Kundu, Lexington, MA (US)

(72) Inventor: Malay Kundu, Lexington, MA (US)

( * ) Notice: Subject to any disclaimer, the term of this patent is extended or adjusted under 35 U.S.C. 154(b) by 0 days.

(21) Appl. No.: 17/383,133

(22) Filed: Jul. 22, 2021

(65) Prior Publication Data

US 2022/0030179 A1 Jan. 27, 2022

Related U.S. Application Data

(60) Provisional application No. 63/055,736, filed on Jul. 23, 2020.

(51) Int. Cl.
*H04N 5/272* (2006.01)
*G06F 3/01* (2006.01)
*G11B 27/036* (2006.01)
*H04N 5/222* (2006.01)

(52) U.S. Cl.
CPC ............ *H04N 5/272* (2013.01); *G06F 3/017* (2013.01); *G11B 27/036* (2013.01); *H04N 5/2226* (2013.01)

(58) Field of Classification Search
CPC ...... H04N 5/272; H04N 5/2226; G06F 3/017; G11B 27/036
See application file for complete search history.

(56) References Cited

U.S. PATENT DOCUMENTS

| | | | |
|---|---|---|---|
| 7,199,793 B2 | 4/2007 | Oh et al. | |
| 9,504,920 B2 | 11/2016 | Kareemi et al. | |
| 2009/0318223 A1 | 12/2009 | Langridge et al. | |
| 2013/0314421 A1* | 11/2013 | Kim | G06T 19/00 345/427 |
| 2016/0198097 A1* | 7/2016 | Yewdall | H04N 5/272 348/659 |
| 2018/0075594 A1* | 3/2018 | Brauer | G06V 10/454 |
| 2020/0110928 A1* | 4/2020 | Al Jazaery | G06V 20/48 |
| 2020/0302664 A1* | 9/2020 | Lee | G06T 11/001 |

* cited by examiner

*Primary Examiner* — Sunghyoun Park
(74) *Attorney, Agent, or Firm* — Eugene H. Nahm

(57) ABSTRACT

The present disclosure provides a system and method for creating at multilayer scene using a multiple visual input data. And injecting an image of an actor into the multilayer scene to produce a output video approximating a three-dimensional space which signifies depth by visualizing the actor in front of some layers and behind others. This is very useful for many situations where the actor needs to be on a display with other visual items but in a way that does not overlap or occlude those items. A user interacts with other virtual objects or items in a scene or even with other users visualized in the scene.

20 Claims, 12 Drawing Sheets

MULTILAYER THREE-DIMENSIONAL PRESENTATION

TECHNOLOGICAL FIELD

The present disclosure relates generally to a system and method for generating a multilayer scene. The present disclosure also relates to injecting the image of an actor into a multilayer scene to produce an output video approximating a three-dimensional space which signifies depth by showing the actor is in front of some layers and behind others.

BACKGROUND

Green screens and virtual green screen technology are currently used to place a person's image on top of a background image or video. Much like a meteorologist on the weather segment of the evening news, the "weatherman" effect occludes the view of the subject material such that the person to has to move from side to side to be able to point out portions of the background without obstructing them.

This is particularly problematic for remote presentations. Today, the actor's video stream is typically displayed in a window completely separate from the content, thereby making it more difficult for the actor to point out content (with anything other than a mouse pointer) and more effectively communicate with the audience. If an actor is placed in front of content (such as by use of a chroma key green screen), the actor occludes some of the very content they are trying to present.

This is very useful for many situations where the actor needs to be on screen in real-time with other items but in a way that does not overlap or occlude those items. Likewise, the actor(s) can interact in real-time with other objects or items on the screen or even with each other in the case of multiple actors.

SUMMARY

The subject matter of this application may involve, in some cases, interrelated products, alternative solutions to a particular problem, and/or a plurality of different uses of a single system or article. The present disclosure thus includes, without limitation, the following example implementations.

Some example implementations provide a computer-implemented method for generating a multilayer scene, the method comprising receiving a video stream data of an actor, using an imaging unit, wherein the video stream data captures the actor at least partially; isolating the actor from the video stream data, wherein the isolated actor is positioned at an actor layer of the multilayer scene; identifying at least two layers of images from one or more input data, wherein the at least two layers of images are positioned at two different depth positions within the multilayer scene; and displaying the multilayer scene on a display unit, wherein the multilayer scene comprises the actor layer positioned in front of one of the at least two layers of images and behind the other one of the at least two layers of images.

Some example implementations provide a system for generating a multilayer scene, comprising an imaging unit capturing a video stream data of an actor at least partially; a storage unit having a computer-readable program code stored therein; and a processor, in communication with the storage unit, configured to execute the computer-readable program code to cause the system to at least: receive the video stream data of the actor from the imaging unit; isolate the actor from the video stream data, wherein the isolated actor is positioned at an actor layer of the multilayer scene; identify at least two layers of images from one or more input data, wherein the at least two layers of images are positioned at two different depth positions within the multilayer scene; and display the multilayer scene on a display unit, wherein the multilayer scene comprises the actor layer positioned in front of one of the at least two layers of images and behind the other one of the at least two layers of images.

Some example implementations provide a computer-readable storage medium for generating a multilayer scene, the computer-readable storage medium being non-transitory and having computer-readable program code stored therein that, in response to execution by processing circuitry, causes an apparatus to at least receive a video stream data of an actor, using an imaging unit, wherein the video stream data captures the actor at least partially; isolate the actor from the video stream data, wherein the isolated actor is positioned at an actor layer of the multilayer scene; identify at least two layers of images from one or more input data, wherein the at least two layers of images are positioned at two different depth positions within the multilayer scene; and display the multilayer scene on a display unit, wherein the multilayer scene comprises the actor layer positioned in front of one of the at least two layers of images and behind the other one of the at least two layers of images.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE DRAWINGS

The accompanying drawings, which are incorporated in and constitute a part of this specification, illustrate aspects of the present disclosure and together with the description, serve to explain the principles of the present disclosure.

Figure 1:
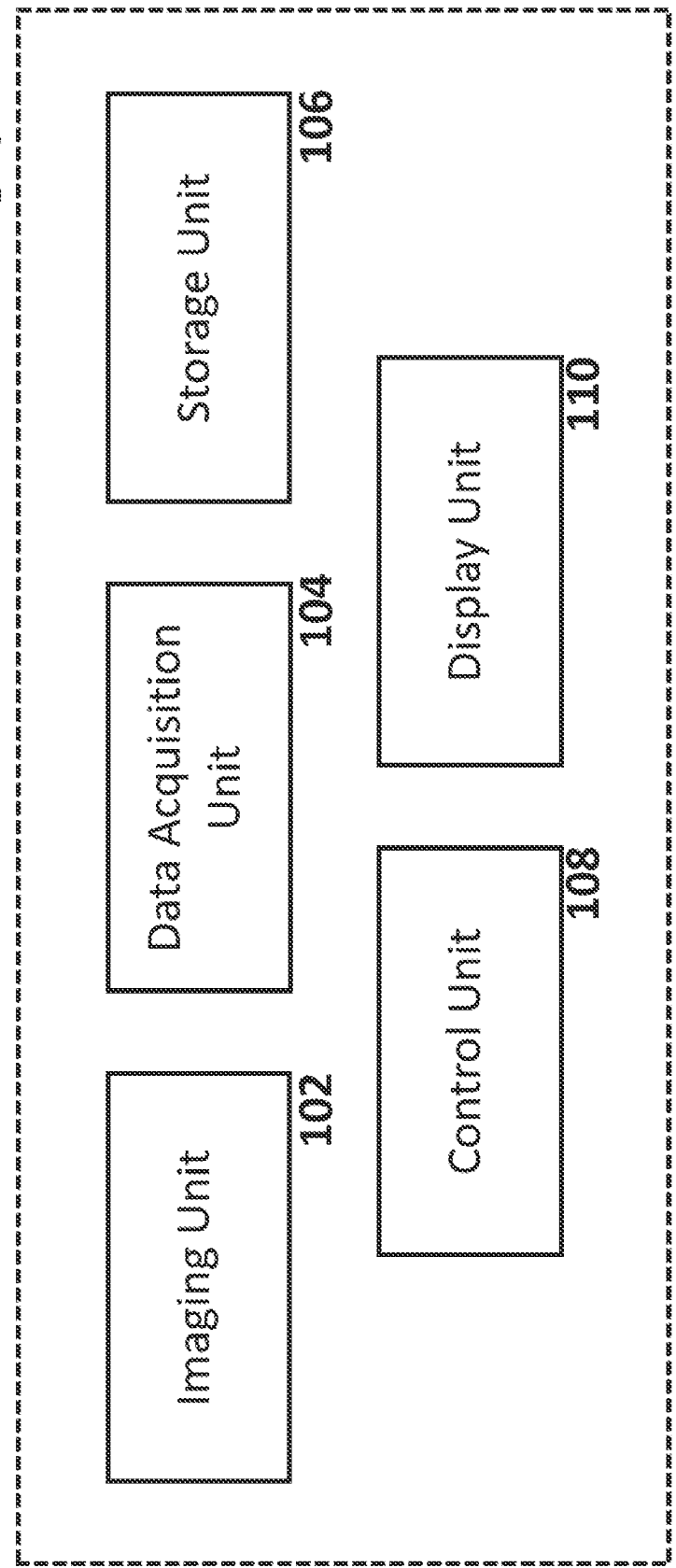
FIG. 1 illustrates a system according to some example implementations.

It should be noted that some details of the figures have been simplified and are drawn to facilitate understanding rather than to maintain strict structural accuracy, detail, and scale.

DETAILED DESCRIPTION

The detailed description set forth below in connection with the appended drawings or figures is intended as a description of presently preferred embodiments of the present disclosure and does not represent the only forms in which the present disclosure may be constructed and/or utilized. The description sets forth the functions and the sequence of steps for constructing and operating the present disclosure in connection with the illustrated examples.

In referring to the description, specific details are set forth in order to provide a thorough understanding of the examples disclosed. In other instances, well-known methods, procedures, components and materials have not been described in detail as not to unnecessarily lengthen the present disclosure.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It should be understood that if an element or part is referred herein as being "on", "against", "in communication with", "connected to", "attached to", or "coupled to" another element or part, then it can be directly on, against, in communication with, connected, attached or coupled to the other element or part, or intervening elements or parts may be present. When used, term "and/or", includes any and all combinations of one or more of the associated listed items, if so provided.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Furthermore, it should be understood that unless otherwise specified, the terms "data," "content," "digital content," "information," and similar terms may be at times used interchangeably.

Furthermore, it should be understood that unless otherwise specified, the term "real-time" refers to processing, displaying, capturing, detecting, identifying, or analyzing data without intentional delay, given the processing limitations of the system.

Various operations may be described as multiple discrete operations in turn, in a manner that may be helpful in understanding embodiments; however, the order of description should not be construed to imply that these operations are order dependent.

Spatially relative terms, such as "under" "beneath", "below", "lower", "above", "upper", "proximal", "distal", "behind", "in front" and the like, may be used herein for ease of description and/or illustration to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable. Such descriptions are merely used to facilitate the discussion and are not intended to restrict the application of disclosed embodiments.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

Some examples of the present disclosure may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer, controller or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed system may be practiced. It is to be understood, however, that those skilled in the art may develop other structural and functional modifications without departing from the novelty and scope of the instant disclosure.

The system may comprise one or more computers or computerized elements in communication working together to carry out the different functions of the system. The system and method contemplated herein further may comprise a storage unit, such as a non-transitory computer readable media configured to instruct a computer or computers to carry out the steps and functions of the system and method, as described herein. In some embodiments, the communication among the one or more computer or the one or more processors alike, may support a plurality of encryption/decryption methods and mechanisms of various types of data.

The computerized user interface may be comprised of one or more computing devices in networked communication with each other. The computer or computers of the computerized user interface contemplated herein may comprise a memory, processor, and input/output system. In some embodiments, the computer may further comprise a networked connection and/or a display screen. These computerized elements may work together within a network to provide functionality to the computerized user interface. The computerized user interface may be any type of computerized interfaces known in the art capable of allowing a user to input data and receive a feedback therefrom. The computerized user interface may further provide outputs executed by the system contemplated herein.

Storage unit or data contemplated herein may be in the format including, but are not limiting to, XML, JSON, CSV, binary, over any connection type: serial, Ethernet, etc. over any protocol: UDP, TCP, and the like.

Computer or computing device contemplated herein may include, but are not limited to, virtual systems, Cloud/remote systems, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

Network contemplated herein may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. Examples include, but are not limited to, Picture Transfer Protocol (PTP) over Internet Protocol (IP), IP over Bluetooth, IP over WiFi, and PTP over IP networks (PTP/IP).

Imaging unit or video capturing devices contemplated herein may include, but are not limited to, various types of cameras, such as, DSLR, non-SLR digital cameras (e.g., but not limited to, compact digicams and SLR-like bridge digital cameras (also known as advanced digital cameras), and SLR-like interchangeable lens digital cameras), as well as video recorders (e.g., but not limited to, camcorders, analog cameras and IP cameras, 3D cameras, and the like; a device that can provide a video feed of any duration, such as a DVR; a portable computing device having a camera, such as a tablet computer, laptop computer, smartphones); and the like. The position or location of the image unit may vary as well. The imaging unit may be facing to capture a front of an actor, a face of an actor, a side view of an actor, a top view of an actor, a rear view of an actor, a perspective view of an actor, and the like. Similarly, the imaging unit can zoom in and out to vary the captured area of the actor or an object.

The image or video files contemplated herein may be any digital image format capable of being interpreted by a computer or computing device. Examples of image files contemplated herein include, but are not limited to JPEG, GIF, TIFF, PNG, Bitmap, RAW, PNM, WEBP, and the like.

The present disclosure generally provides a system and method for generating a multilayer scene. More specifically, the present disclosure provides a system and method for injecting or inserting a data feed (for example, one or more images, a video stream, a live video stream), such as a video capturing an actor (a person digitally imaged or captured by an imaging unit), into the multilayer scene to produce a video (e.g., a composite video) approximating a three-dimensional space having depth by showing the actor in front of one or more layers of the multilayer scene and behind other layers of the multilayer scene. The present disclosure describes a system and method that can be practiced in receiving multiple media input (such as, images, videos, and the like) to create a displayable scene in which the displayable scene includes multiple layers of graphical or visual data. The final output video of the multilayer scene can be viewed using a display unit.

Among other things, the system displays, injects, and/or places the data feed in varying degrees of depth (i.e., each of the layers of the multilayer scene, including in front of, behind, or in between the one or more layers of the multilayer scene) such that the data feed, such as a data feed representing an actor, coexists, is placed, or is displayed on a display without obstructing at least some portion or one or more of the layers of the multilayer scene. In addition, the system enables the injected data feed to be interacting with at least a portion of the one or more layers. For example, an actor or a user can be captured as the data feed and the motion of the actor can cause a virtual interaction with an object that is presented in or by another layer of the multilayer scene on which the actor image or video feed is injected. Such merging of multilayer scene and data feed is displayed on a display as an output video or an output image. As a non-limiting example, the object can appear as a solid object, an opaque object, a translucent object, a transparent object, or an object displayed with any varying degree of transparency or translucency by the display.

In referring to the detailed description of the present disclosure, the examples of the system and method primarily presents displaying an actor data feed (i.e., data feed representing an actor, such as a user being captured by an imaging unit, such as a video stream of a user) into a multilayer scene. It should be noted that some details of the figures have been simplified and are drawn to facilitate understanding rather than to maintain strict structural accuracy, detail, and scale. Specifically, a video stream of a person (i.e., the user, the actor, and the like) is described with a simplified drawing or representation in place of an actual photo, video, or other types of data recording of the recorded subject or object. This is to readily demonstrate the functions of the present disclosure with clarity. The visual representation contemplated herein primarily is geared towards actual recording of a person, an object, or other visible things. Simplified characterizations of such in the drawings are not literal demonstrations of the present disclosure in actual implementation but representative.

Referring now to FIG. 1, the system for displaying data in a multilayer scene, hereinafter also referred to as a data processing system 100, comprises an imaging unit 102, a data acquisition unit 104, a storage unit 106, a control unit 108, and a display unit 110. Such system component units represent software units executing on a processor or a processing circuitry of a computer system, one or more hardware components executing the method described herein, or any combination of the two thereof. While FIG. 1 illustrates the system component units grouped as a single system, such association is not limited to form a single physical hardware unit (such as individual units formed on a single computing device), but also represent functional associations of the system units collectively performing the methods described herein. The imaging unit 102 captures data feed, such as image(s) and video(s). In some examples, the imaging unit 102 records or captures images or videos of an actor (or a user). The data acquisition unit 104 controls and receives data captured by the imaging unit 102. The control unit 108 processes and practices the method described herein using the storage unit 106. The display unit 110 outputs resulting data post processing as an output video.

Figure 2:
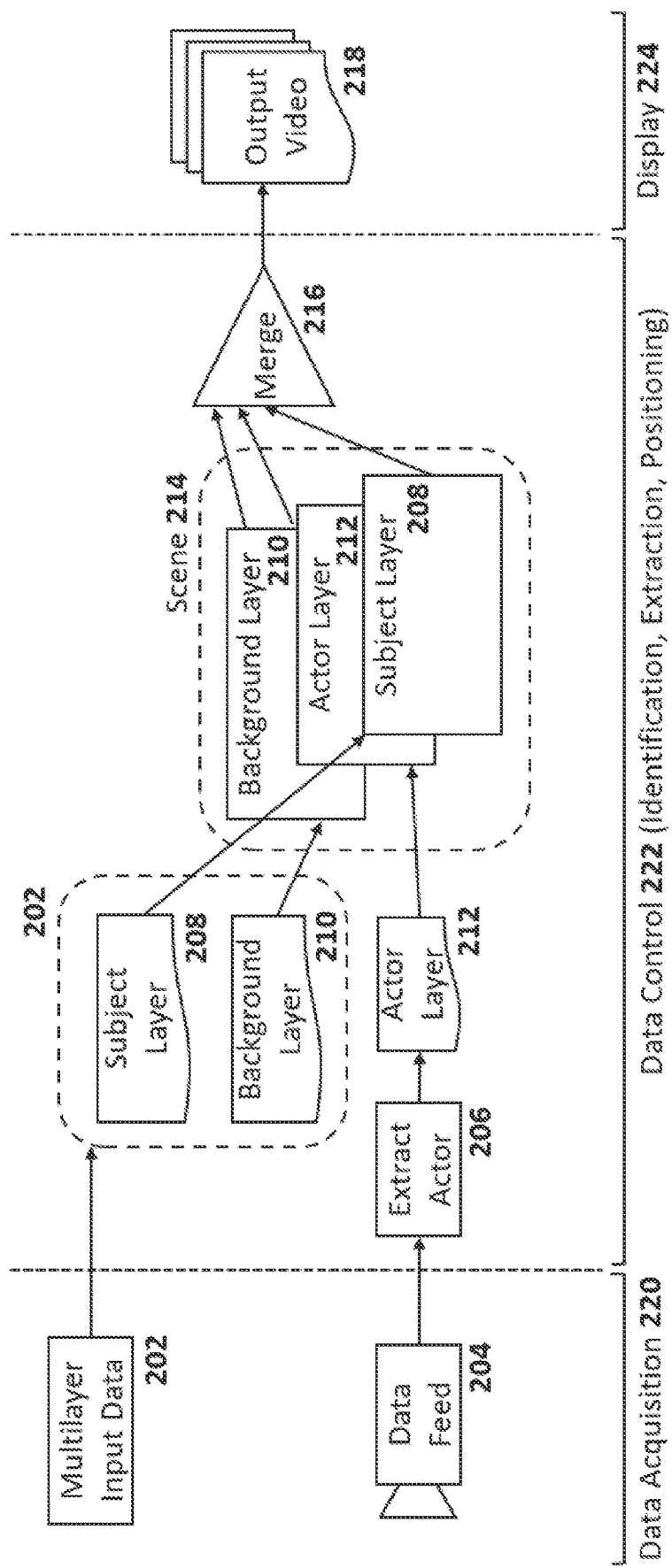
FIGS. 2 and 3 are flowcharts illustrating various steps in a method of generating a multilayer scene, according to various example implementations of the present disclosure.
Figure 3:
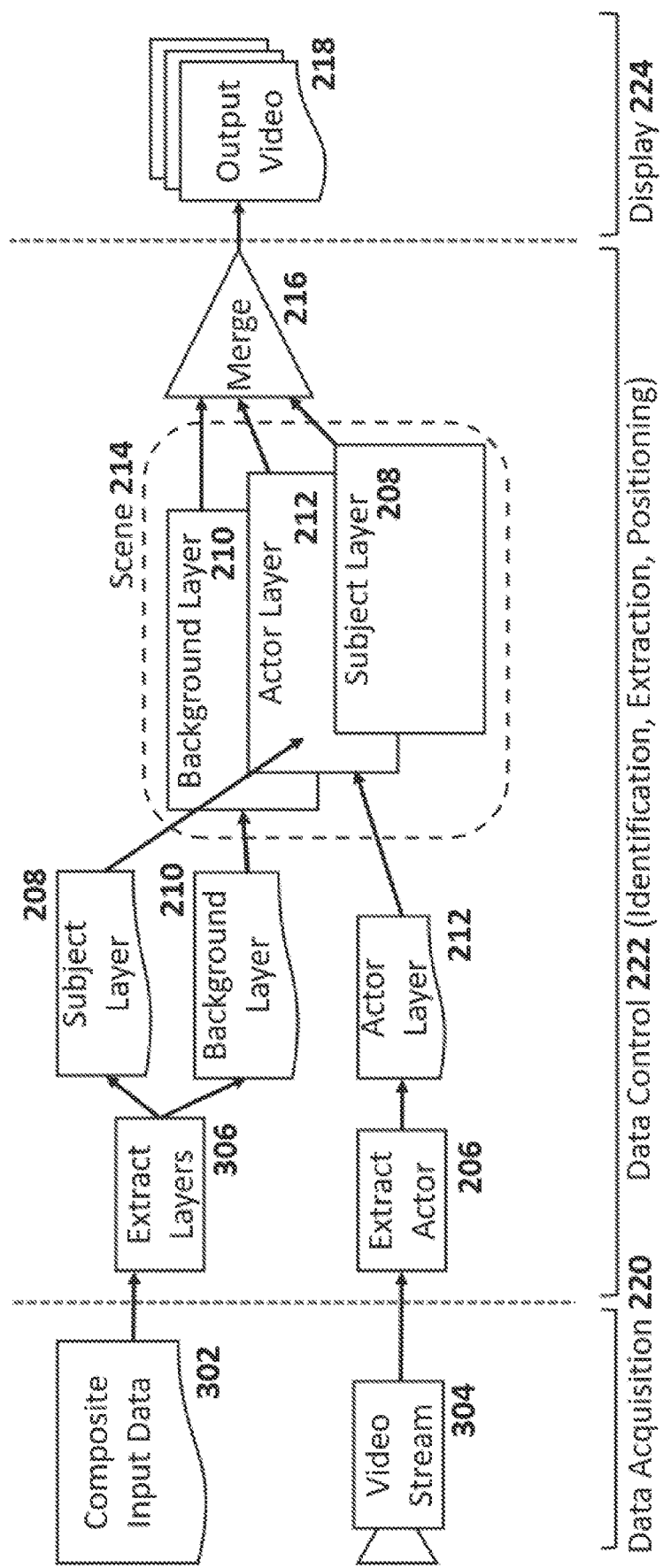

FIGS. 2 and 3 describe the method with which various data types (such as, data feed 204 and multilayer input data 202) are processed by the present system to display an output video 218 including a multilayer scene. While the process is described in a sequential manner, different input data can be processed individually or parallelly without one of the input data being dependent on the process or progress in which the other data feed is processed. As described in FIG. 2, the system (also may be referred to as data processing system 100) receives a data feed 204 and a multilayer input data 202 via the data acquisition unit 104 of the data processing system 100. The data feed 204, such as a video stream 304, is acquired using the imaging unit 102. During the data acquisition phase 220, the input data (such as, multilayer input data 202 and composite input data 302) are acquired by the data acquisition unit 104. The data control unit 108 identifies the various types of input data and data captured by the imaging unit 102, and its scene layers 202, extracts, and merges them during data control phase 222. Finally, the display unit 110 presents the multilayer scene 214 as the output video 218. In some examples, the input data is multilayer input data 202 comprising at least a set of separate but coordinated input scene layers 202. The multilayer input data 204 having the coordinated input scene layers may be time-synchronized input data with multiple layers (i.e. multilayer input data). For example, the multilayer input data comprises a background layer 210 video feed and a subject layer 208 video feed that are time-synchronized. In some examples, the scene layers of the multilayer input data 202 may be coordinated by association of various objects captured in the input data. For example, the background layer 210 can comprise an object that is associated with or correlated with another object captured by the subject layer 208, and vice versa.

In some examples, the input data is a composite input data 302 comprising various data, such as a fixed image, slide, video, and the like. As shown in FIG. 3, the composite input data 302 is processed to extract a background layer and a subject layer (i.e., extract layers 306). As such, an extraction of layers 306 can be necessary when the input data does not contain layered data, such as the multilayer input data 202.

In some embodiments, as described in FIG. 2, the system could likewise receive a multilayer input data 202 that comprise multiple scene layers, such as a background layer 210 and a subject layer 208. In this example, the multilayer input data 202 contains two layers. The multilayer input data 202 can be a collection of the background layer 210 and the subject layer 208. Similarly, the multilayer input data 202 can be two separate input data of a background layer 210 and a subject layer 208.

From the data feed 204, such as a video stream 304, the system extracts the images (or a collection of images, such as a video clip) capturing one or more actors (i.e., extract actor 206). These imaging unit-captured data feed 204 (such as the video stream 304) includes at least a part of the actor, which is processed by the system in order to isolate the portion of the data feed that includes at least a part of the actor. In some examples, the extraction or isolation of the actor can use chroma key green screen, virtual green screen technology, skeletal/human pose recognition, neural networks trained to isolate the actor within an image or video stream, and the like. A various known image processing and video processing techniques can be applied to extract or isolate the actor from the data feed 204 or the video stream 304. The extracted actor is then placed on the actor layer 212 comprised of a non-transparent region including the isolated actor and a transparent region not including the isolated actor.

Once the actor layer 212 is identified from the data feed 204, such as the video stream 304, and the multiple layers 202 are identified from the multilayer input data 202 or the composite input data 302, the actor layer 212 which includes the isolated actor 206, is placed in front of the background layer 210 and behind the subject layer 208, thereby generating a scene 214 that comprises three layers (i.e. multilayer scene). In other words, the actor layer 212 is positioned between the background layer 210 and the subject layer 208. Such a collection of at least the three layers, the background layer 210, the actor layer 212, and the subject layer 208, depicting visual or displayable data forms a multilayer scene 214. A multilayer scene refers to one or more layered visual representation of data, such as image(s) and video(s). The background layer 210, the actor layer 212, and the subject layer 208 are merged 216, for example flattened, to render the output video 218, then displayed 224 using a display unit 110. In some examples, flattening of the layers in the scene 214 can be done such that any region of the resulting output video 218 or image is made up of the video or image from the forwardmost layer of that same region where that forwardmost layer of the region is non-transparent. In case the forwardmost layer of the region is semi-transparent, that region of the output video 218 or image is made up of a visual combination (e.g., the colors of layers are averaged, mixed, or otherwise visually combined) of the forwardmost layer and recursively the flattened layer(s) behind it. The display unit 110 may be a monitor, a projector, augmented reality glasses, virtual reality headset, display presented by other wearables, or any other devices that display image(s) or video(s) for visual presentation.

Figure 4:
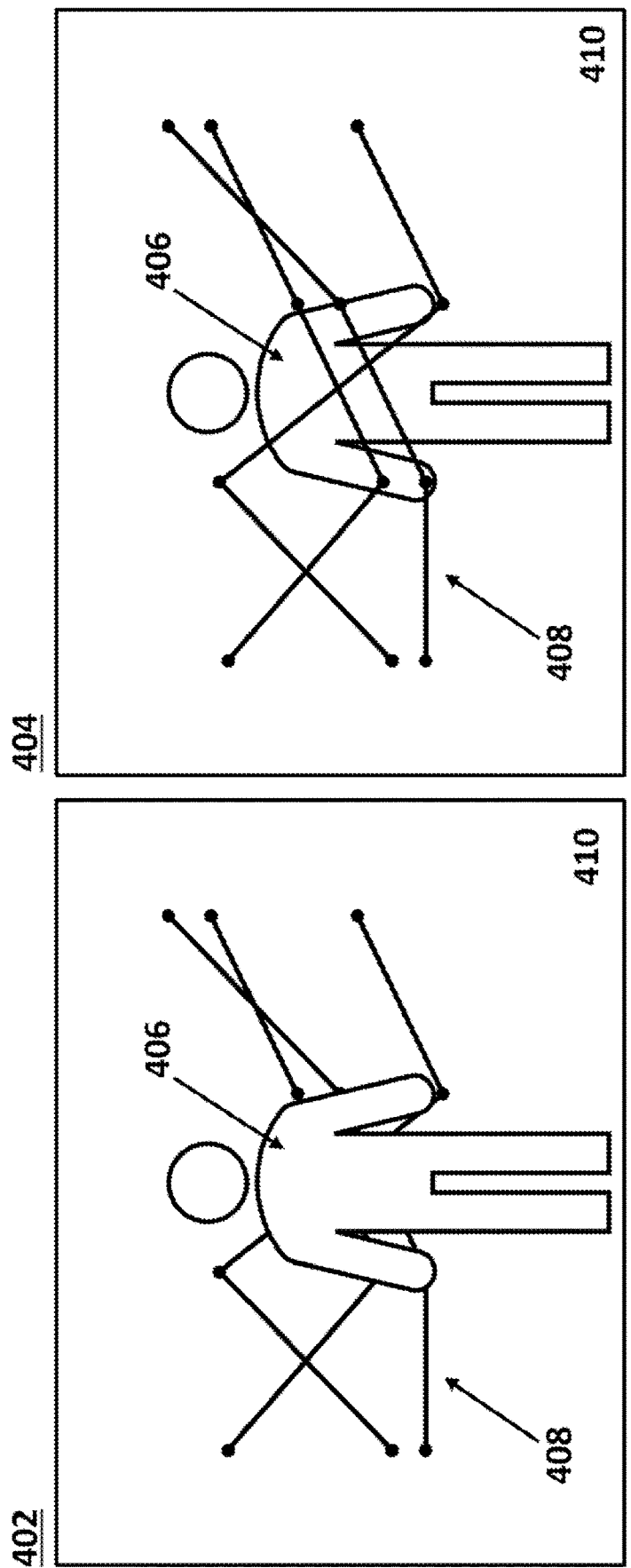
FIG. 4 through 9 illustrate example implementations according to the system and method of the present disclosure.

FIG. 4 shows example scenes 402 404 from an output video presentable using a display unit. In scene 404, the subject layer is overlayed in front of the actor layer. The actor 406 is presented in the actor layer where the subject 408 of the subject layer is unobstructed by the actor. The background layer 410 is presented behind the actor layer. As shown, each of the scene layers can include transparent portions such that the output video plays a multilayer scene depicting the actor 406 and the subject 408 of the subject layer over the background layer 410. In this example, the subject layer is showing the subject 408, a graph placed in front of the actor layer, where the actor layer is shown with the isolated or extracted actor 408. The background layer 410 is placed behind all other layers. The scene 402 shows a scene prior to employing the actor layer in between the subject layer and the background layer 410. In this scene, the actor 408 of the actor layer is not placed in between the subject layer and the background layer 410. In some examples, the background layer 410 and the subject layer are extracted from a composite input data. In some examples, the background layer 410 and the subject layer are sourced from a multilayer input data.

In some examples, a three-dimensional effect (e.g., a output video with multiples layers presented with each layer having variation in depths relative to one another) is achieved by identifying multiple layers from a composite input data. The composite input data can be analyzed to identify a background layer and a subject layer. Each frame of the output video is composed of at least one background layer behind the actor, at least one actor layer in front of the at least one background layer, and at least one subject layer in front of the at least one actor layer. In other words, the output video comprises at least three differently layered scene, i.e., a multilayer scene. Similarly, the output video may comprise one or more scenes having three or more different layers where the layers are positioned or stacked (i.e., a depth position within the layers/stack of layer) to create the three-dimensional effect. While the example implementations of the present disclosure, demonstrated in the drawings, primary show the multilayer scene with three layers in a scene (e.g., the background layer, the actor layer, and the subject layer), a plurality of layers can compose the multilayer scene. For example, a plurality of layers can be positioned between the background layer and the subject layer, thereby creating the three-dimensional effect or varying degrees of depth (i.e., varying depth positions of the layers). In another example, the multilayer scene can comprise multiple layers of background layers to create a varying degree of depth in the background, such as placing an image (or a frame of a video) of a mountain further behind an image of a tree. Similarly, multiple layers can be introduced in the scene subject layer. In other words, the multilayer scene may comprise a multitude of background layers, a multitude of actor layers, and a multitude of subject layers. With multitude of layers comprising the multilayer scene, a visualization effect of achieving a three-dimensional effect is enhanced.

Figure 5:
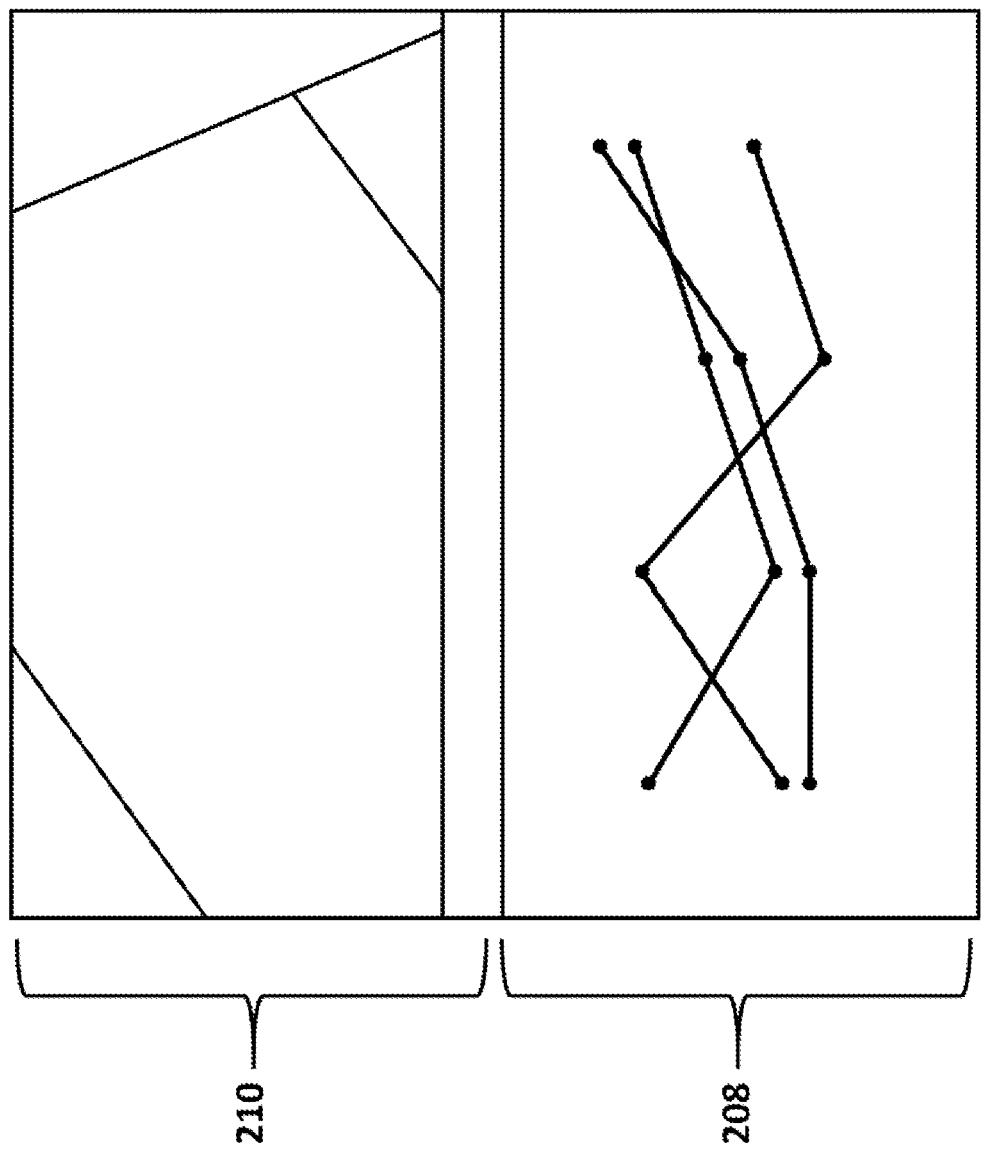

Slide reconfiguration using presentation software. The layers of the multilayer input data can be identified in a few different ways. In one example, a presentation software (such as Powerpoint or Google Slides) can be configured such that a slide is a multiple (corresponding to the number of layers it contains) of its typical size. As described in FIG. 5, the slide is configured to be double its typical size to include the subject layer 208 and background layer 210 on the same slide. One half is used as the background layer 210, and the other half is used as the subject layer 208. Because this is made through the use of the presentation software itself, each half retains all the functionality (such as animations, etc.) available through the presentation software. The subject layer can utilize a specific color to indicate transparency in regions of the layer, and lack of the specific color in regions of the layer indicating opacity or translucence. The opaque or translucent regions indicate subjects (i.e., subject material of interest) in the subject layer. In this example, the graph is shown as the subject material of interest in the subject layer. And the background layer provides aesthetical design elements.

Figure 6:
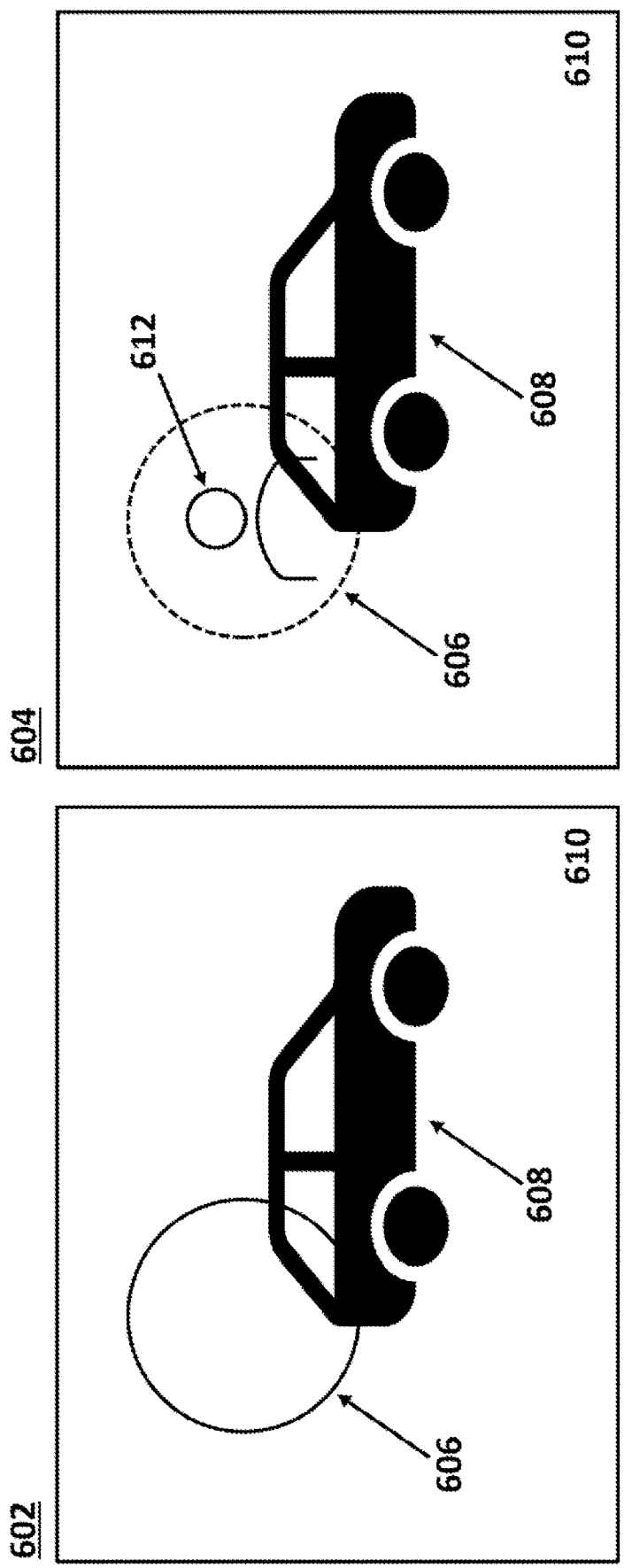

In some examples, using the presentation software, a typical sized slide is used in conjunction with at least one predetermined automatically recognizable placeholder data location that indicates the placement of the actor layer. As shown in FIG. 6, the placeholder data location 606 is inserted into the slide and placed in front of any content assigned to the background layer 610 and behind any content assigned to the subject layer 608. The placeholder data location may also be sized and shaped on the slide to indicate the regions of the actor layer to which the actor layer is to be placed. Once the placeholder data location 606 is designated within the actor layer, the resulting output video has a multilayer scene including the actor layer 612 placed within the designated placeholder data location 606. Upon display, the actor layer is displayed in place of the placeholder image. In some examples, the substitution of the actor layer in place of the placeholder image occurs during the positioning or stacking of the layers prior to the rendering of the output video or image. In some examples, the image or a frame of the output video is rendered containing the placeholder image, and upon the system identifying the placeholder image, the visible portions of the placeholder image are then substituted with the corresponding portions of the actor layer 612.

User Interface of Presentation Software. In some examples, a user interface of a presentation software (such as, Powerpoint or Google Slides) is utilized, redesigned or modified to include the actor layer on a scene. The actor layer can be placed on the slide and placed in front of or behind the other subjects of the subject layers or other layers using the presentation software options such as "Send backwards", "Send to back", "Bring forwards", and "Bring to front". In some examples, a user interface is implemented to enable a user to manipulate slides already produced using a presentation software (such as, Powerpoint or Google Slides). The user interface displays the subjects or objects on the slide in a way that clarifies which are on which layers of the slide (i.e., which objects are in front of or behind others). The user interface then allows the user to choose where amongst those layers they would like to place the at least one actor layer—i.e., in front of which layer or behind which layer or in between which layers. In some examples, automated layering is used. Automated layering involves using automated means to distinguish the background layer from the subject layer and insert the actor layer in between them.

Artificial intelligence and deep learning techniques can be employed for the system to identify the background layer and the subject layer. In some examples, artificial intelligence or deep learning can be employed for the recognition of the background layer and the subject layer. In some examples, this is accomplished by annotating a training set of data, such as images, videos, slides, screen shares, and the like (i.e., potential composite input data 302) to identify and extract which layers of the data should be in which layer depth position, such as the background layer and the subject layer. A neural net is then trained using the training set to create a classifier. The classifier is then applied to the composite input data to identify scene layers comprising the background layer and the subject layer. The actor layer can then be inserted in between the two layers.

In another example, the system uses the presence or non-presence of a feature to determine which regions of the composite input data are assigned to which layers. For example, with a composite input data of floating balloons against the sky and utilizing a feature classifier trained to identify balloons, the regions of the composite input data with balloons present are assigned to the subject layer while the regions with balloon non-presence (i.e., images of the sky) are assigned to the background layer. Similarly, other feature classifiers with non-binary outputs can be thresholded or otherwise utilized to assign regions of input data (e.g., composite input data and multilayer input data) to a plurality of layers.

An expert systems approach can be employed for the system to identify the background layer and the subject layer. The expert systems approach employs a set of rules for distinguishing the background layer from the subject layer. In some examples, particular types of content may be prioritized to be assigned to the subject layer which is further in front and therefore less likely to be obstructed. By way of an example, text content can be prioritized to be assigned as the subject layer so that it is placed in front of the actor layer, thereby not obstructed by the actor layer. Other regions of the image can then be assigned to the background layer.

Similarly, multiple scene layers of a multilayer input data can be ranked to determine the order or layer/depth position in the multilayer scene based on the types of the content. For example, a text with certain keywords may be ranked higher than others or be prioritized. A particular type of images, colors, shapes, data type, size or other features may indicate a higher rank or higher priority over others.

In some examples, two different regions from the same layer input data (e.g., a scene, a layer, an image, a video feed, and the like) can be positioned to two different layer positions (i.e., the depth position when the layers are stacked). One of the two different regions can be positioned to the background layer while the other region can be assigned to the subject layer. In some examples, application-specific knowledge is taken into account in assigning some regions of the input data (e.g., a scene, a layer, an image, a video feed, and the like) to the background layer while other regions are assigned to the subject layer. For example, for a spreadsheet application (e.g., Excel or Google Sheets), the system can assign the gridlines to the background layer while the numbers and text in the spreadsheet cells are assigned to the subject layer. Therefore, with the actor layer placed in between the background layer and the subject layer, the actor will stand in front of the gridlines but not obstruct the content of the cells themselves. By way of another example, the system may deprioritize a region of the input data specific to menu operation, such as the toolbars at the top of an application window, such that they are assigned to the background layer. This enables the content of interest within the subject layer to be presented without being obstructed by a region that are typically not relevant to the presentation. FIG. 4 shows an example where the graph (i.e., subject content of interest) is overlayed in front of the actor.

The position of the layers (i.e., the depth position within the layers, for example, a subject layer and a background layer) in a scene can be determined based on the location of the content within or on the layer. By way of an example, the content of the data toward the top of the scene is deprioritized and assigned to the background layer while content toward the middle or bottom of the scene is prioritized to be in the subject layer. This enables the actor to be able to stand and present content which is occluding the actor's lower and possibly middle section without the actor's head being obstructed by the content located higher up in the scene.

The system may employ user assisted layering. This involves utilizing the automated layering approaches discussed above to provide a default "suggested" or "recommended" layering order to give the user a starting point from which they can proceed to further alter or customize the layering using a user interface.

The layers of the multilayer scene are positioned and presented in varying degrees of depth, such that the data feed, such as a video stream representing an actor, coexists, is positioned, and/or is displayed on a display unit without obstructing at least some portion or one or more of the layers of the multilayer scene. In some examples, depth information is extracted from the input data and used to position layers relative to each other. The depth information can be extracted from the input data or the data feed. Once depth information related to the scene has been extracted, portions of the scene are placed in different layers in accordance to their distance (depth) from the camera. These portions are assigned to one of the layers defined in the scene. Background layers and subject layers are both instances of the layers within the scene. The actor layer can be positioned in between the layers in the scene in accordance with the distance of the at least one actor from the camera. As such, the actor can be seen to be moving back and forth among image portions displayed in the various layers of the scene. And the actor can interact with the subjects positioned in any of these layers.

In some examples, a depth-sensing imaging unit (including, but not limited to, stereoscopic cameras, multiple cameras used together, 2D cameras complemented with lidar, cameras on mobile phones with depth sensing technology, and the like) is used to extract depth information from a scene captured by the imaging unit. In some examples, the imaging unit is used in conjunction with recognition of depth cues in the scene in order to extract depth information from the scene. Such depth information can be identified from the data feed capturing the actor (e.g., a video stream) and the multilayer input data. Different portions or regions of a single scene can be assigned with differing depth level which defines the positioning of the portions or regions within the layers of the scene.

The system extracts an image of the actor from the video stream or the data feed using various techniques including, but not limited to, use of chroma key green screen, virtual green screen technology, skeletal/human pose recognition, neural networks trained to isolate the actor within the image.

As an illustrative example of embodiments utilizing neural networks, the neural network is trained using a training set of images containing annotated human (i.e. actor) faces and body parts. Once trained, the neural network is used as a classifier by which it can tag, in a binary matter, which regions of the image are most likely part of a human face or body parts. The identified regions are considered the image of the actor which can be extracted from the video stream or the data feed capturing the actor on a frame by frame basis.

The system described herein additionally employs scaling of the input and defining layering order. In some examples, more than one actor is displayed in the same scene with a shared space. The space can be a virtual space (such as virtual dance floor) or an actual physical space such as one of the actor's living room that is captured by the imaging unit. By way of an example, when displaying more than one actors in the shared space, scaling and normalization of the image capturing the actors provides proportioning of the actors' image size captured in the video stream or the data feed such that they are similar in size on the display. This can be done by applying feature recognition on the actors and normalizing the scale. Where the shared space is the actual physical space of an actor, that actor can be used as a reference for scaling and normalization of another actor presented on the display such that the two actors are sized proportionately to the same scale.

As described above, in some embodiments, depth information is extracted from the data feed and used to place layers relative to each other according to their distance (depth) from the camera. In some examples, when combining more than one actor into a shared space, the distance between the imaging unit (e.g., a camera) of the actor can be used to modulate the scale of that actor when placed into a local space of another actor. More specifically, the actor is made larger when coming closer to the camera and made smaller when moving further from the camera. Furthermore, the layer position of the actor can be determined based on a dynamic distance between the imaging unit and the actor. As the actor moves closer to the camera, the depth position of the layer capturing that actor can be assigned toward the front of the layers in a multilayer scene. Similarly, as the actor moves further away from the camera, the layer position of the layer capturing that actor can be assigned further behind among the layers in a multilayer scene.

More examples of modulating size and dynamic positioning of layers are presented below. In some examples, characteristics (such as size, shape, sharpness, brightness, orientation, presence/non-presence, or other characteristics) of features identified on objects (including actors or objects on other non-actor layers) by means such as feature recognition are used as depth cues enabling such dynamic positioning. In some examples, the relative sizes of the actors (as determined by comparing the size of features identified on the actors) are used as such depth cues. In one example, when actor A is standing closer to the camera capturing actor A than actor B is standing to the camera capturing actor B, actor A is displayed proportionally larger in size and be placed in a layer that is more forward in comparison to actor B's displayed size and layer position on the display (e.g., the output video). In another example, when actor A is standing further from the camera capturing actor A than actor B is standing to the camera capturing actor B, actor A is displayed proportionally smaller and be placed in a layer that is further away from the front in comparison to actor B's displayed size and layer position on the display (e.g., the output video). In some examples, such functionality will allow two or more actors to take a virtual (i.e., the two or more actors are not present in the same physical space) selfie or a photo together where the first actor can step further away from the camera allowing that actor to extend the arm across the back of the second actor such that the second actor occludes most of the arm except for the hand which reappears extended just past the second actor's shoulder.

Figure 7:
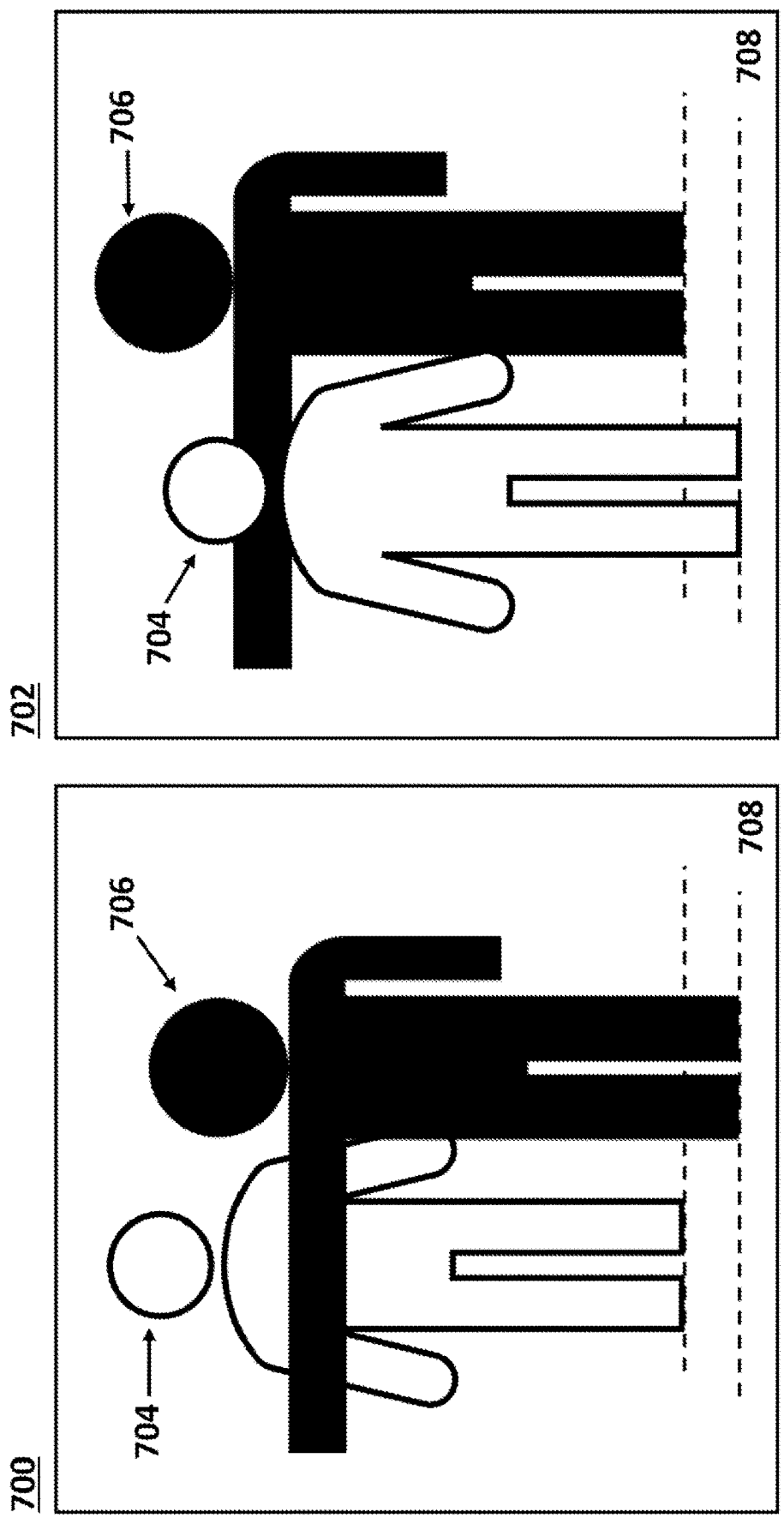

FIG. 7 illustrates an example depth-based layering for engagement between two or more actors. The background layer 708 is identified and positioned the furthest to the back of the layers. The first actor is extracted from the first data feed or the first video stream and identified by the system. The second actor is extracted from the second data feed of the second video stream and identified by the system. Based on each of the distance between the actors and the cameras (e.g., imaging units) the layer positions between the first actor layer and the second actor layer are determined. The scene 700 shows the first actor layer 706 being placed ahead of the second actor layer 704. In this case, the distance between the first actor 706 and the camera recording the first actor is less than the distance between the second actor 704 and the camera recording the second actor 704. The output video 702 shows the first actor layer 706 being placed behind the second actor layer 704. In this case, the distance between the first actor 706 and the camera recording the first actor is greater than the distance between the second actor 704 and the camera recording the second actor. Thus, a part of the first actor's arm is occluded by the second actor in this scene 702. In another example, the depth-based layering for engagement between two or more actors can identify the distance each of the actors travel from their initial position to the next position. In other words, the depth-based layering can be based on the camera recording the traveled distance by each of the actors instead of the distances between the actor and their corresponding cameras.

As an alternative to automated dynamic ordering of the layers, a manual user interface may be used as well. In some examples, by use of a trigger (including, but not limited to, a remote control, voice or speech trigger, gesture, or key press), an actor can move their own layer forward or backward to alter the positioning of the layers within the scene. As an example, this approach would solve the selfie or photo layering problem described earlier without having to move closer or further from the camera.

Just as size or scale can be modified, so too can the lateral position of the actor within the output video. In some examples, the lateral position of the actor within its actor layer is controlled simply by identifying the position of the actor within the actor's own local space. As an actor moves sideward (e.g., left or right) within the actor's own local space in front of their own camera, so too will the actor within the actor layer presented in the output video. Alternatively, the position of the actor within its layer is not a direct representation of the actor's position within the actor's own local space.

In some examples, the position of the actor within its actor layer of the multilayer scene is fixed in place. While the actual actor portrayed by the display unit is in motion, the actor's position within the layer is fixed in position within the output. For example, the actor captured in the actor layer of the multilayer scene in FIG. 6 may move around the field of view of his camera, the images of his face in each video frame are extracted using basic face tracking methods and placed in the fixed position on the output video.

Figure 8:
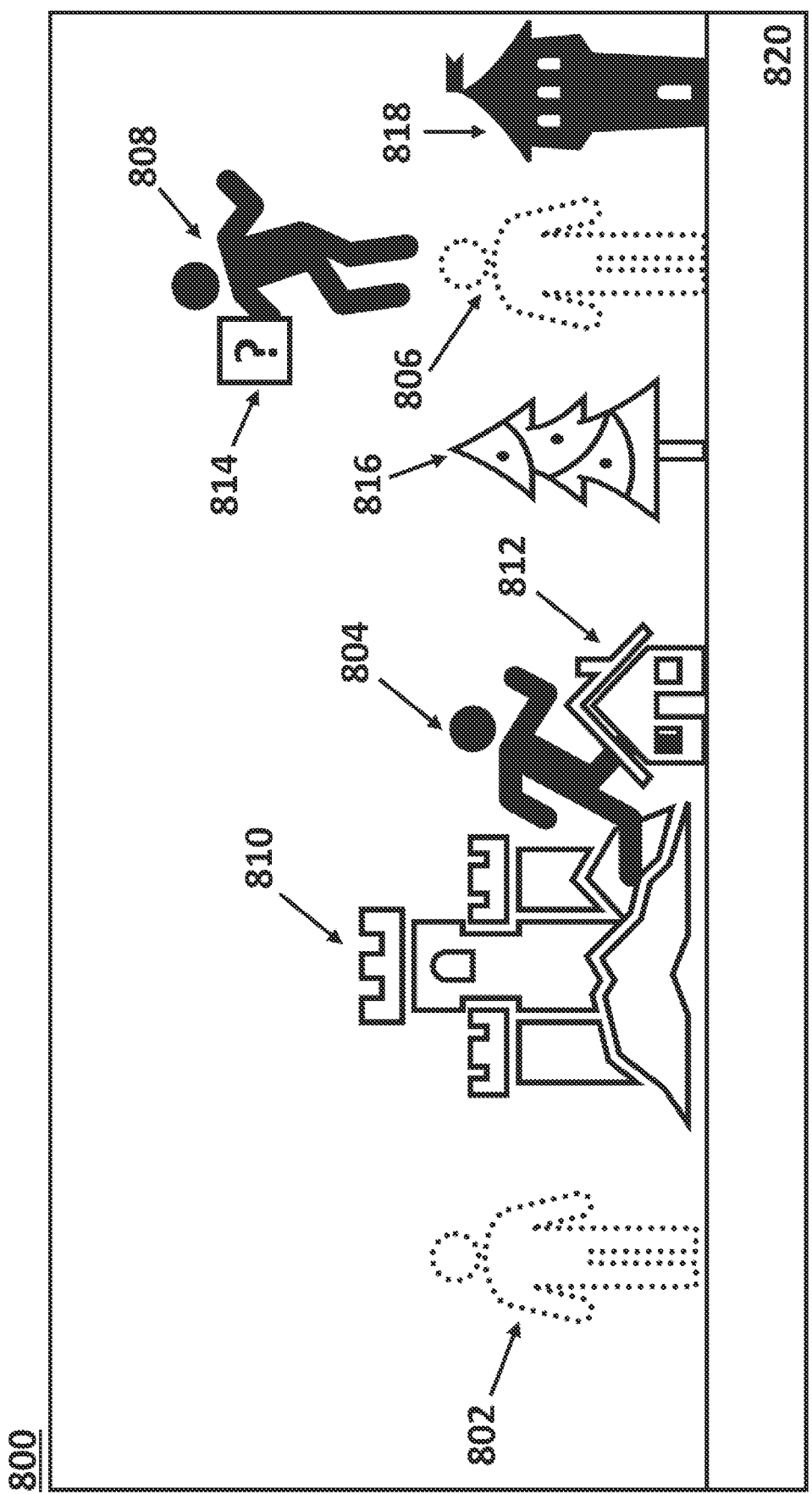

In some examples, changes in the lateral or vertical position of the actor within its actor layer are triggered by recognition of gestures performed or exercised by the actor. The gesture performed by the actor (i.e., a user or a person captured by a camera) is captured by the imaging unit. By way of an example, such gesture recognition includes the system recognizing a mock running pose of the actor which, in turn, triggers the position of the actor within its actor layer to change. In other words, the gesture performed or exercised by the actor, which is captured by the imaging unit, is identified by the system. In turn, the lateral or vertical position of the actor depicted within its actor layer (i.e., a graphical representation of the actor recorded by a camera) changes. FIG. 8 illustrates another example of gesture induced action (e.g., a motion, a movement, or a change, in the visually representation). In FIG. 8, this feature of the present disclosure is provided in an application of a video gaming environment where the actor's image or video is portrayed, using the imaging unit, while the actor is playing a video game. In this scene 800, the running gesture of the actor captured by the imaging system is recognized by the system which enables the position of the actor within its actor layer to run, as demonstrated by the initial position of the actor 802 and the gesture induced action showing the actor depicted in this scene 800 running 804. The scene 800 shows the actor's position within its actor layer prior to the system recognizing the running gesture, at 802, and after, at 804. A subject of the subject layer (e.g., a house 812) is shown occluding the actor image due to the subject layer being positioned in front of the actor layer and a subject of the background layer (e.g., a castle 801, a tree 816, a tower 818) is shown behind the actor layer. Similarly, a mock jumping gesture by the actor, being recorded by the imaging unit, can cause the position of the actor within its actor layer to vertically jump on the screen at 808 from position 806, even when the actor in its physical space (i.e., non-virtual/real space) may not have actually left the ground. Again, a subject (e.g., a question mark box 814) is shown layer on top of the actor layer, thus occluding the jumping actor captured in the actor layer. Scene 808 also depicts how the system can be utilized to have more than two actors depicted in a multilayer scene on the same layer's depth position within the scene. Two actors 808 804 are depicted in this scene 800. In this scene 800, the question mark box 814 can be an interactive object, the detail of which is provided below.

Figure 9:
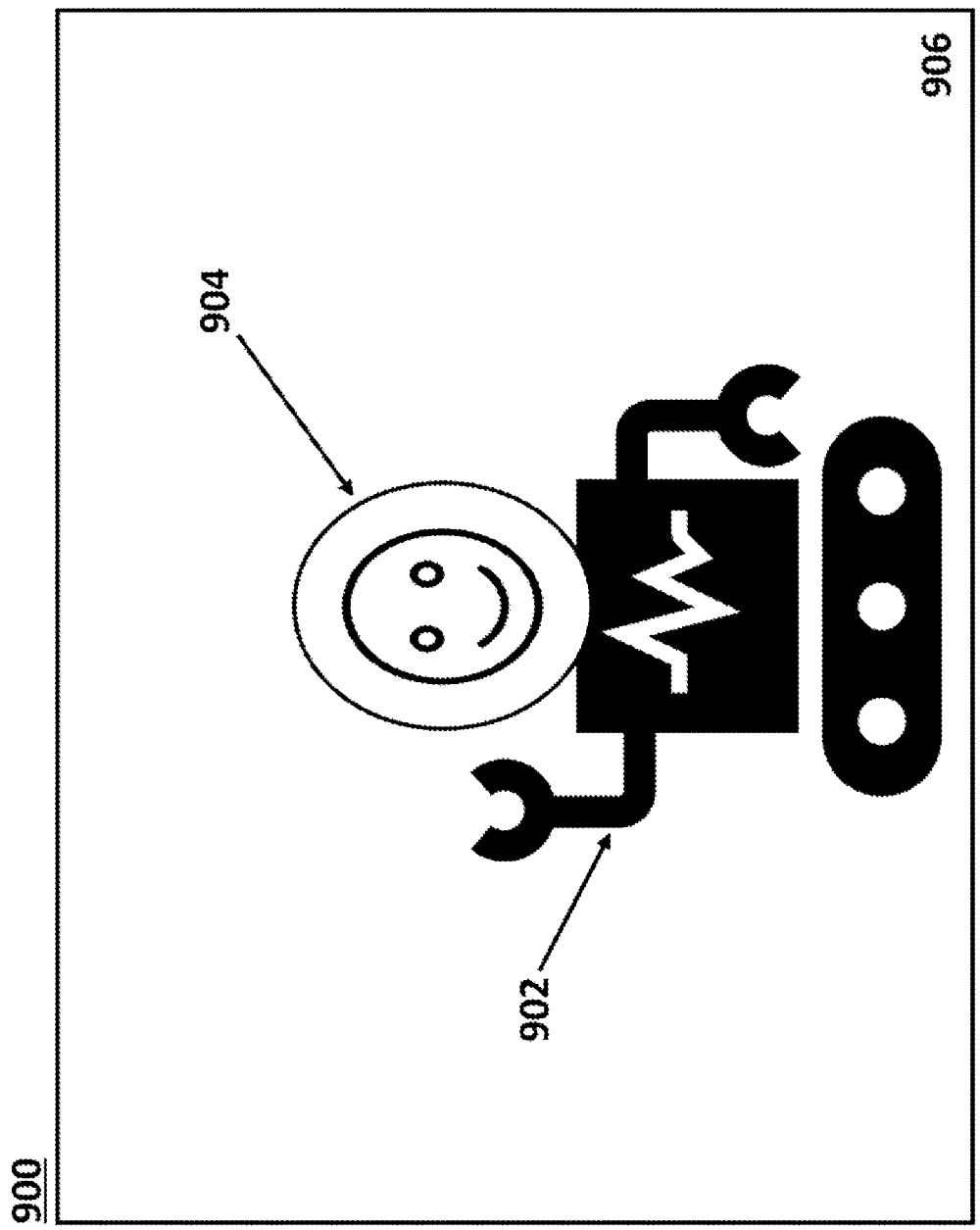

In some examples, a partial actor image (such as the face, head, or bust) may be extracted from the actor to be portrayed as the actor in the actor layer. Non-limiting example of such feature includes, as shown in scene 604 of FIG. 6, displaying the actor's bust extracted from the video feed in a fixed position within the actor layer during a presentation. As shown in FIG. 6, as the actor moves around the field of view of his camera, the images of his face in each video frame are extracted using basic face tracking methods and placed in the fixed position on the multilayer scene of a presentation. In another example, as shown in FIG. 9, the actor's face 904 extracted from the video stream is affixed to a virtual character or an avatar 902 placed on the actor layer. This scene 900 comprise a background layer 906, a subject layer (showing the avatar 902), and the actor layer (showing the actor 904). Such virtual character may be controlled by the actor in a video game setting employing the gesture and motion recognition techniques, inter alia, described herein. The image of the actor's face in each video frame are extracted using basic face tracking methods and positioned in place of the face of an avatar. It is to be understood that while a partial actor image is separately discussed herein, an image or graphical representation of the actor is not limited to capturing the entire actor with the imaging unit but includes any portions of the actor's body captured by the imaging unit.

The present disclosure provides a feature in which the system enables the actor to be interacting with a subject (also herein referred to as an object, e.g., a graphical object contained in the subject layer) viewable using the display unit. Such an object can be interacted by the actor via the actor within the actor layer. The physical actor can enable such interaction using gesture recognition and motion recognition features of the system. Interaction, as described herein, refers to the actor image displayed in the multilayer scene to be making contact with, controlling, or otherwise causing the object to be triggered by the actor image's presence, gesture, or motion around or about the object image displayed in the scene.

Objects can be located in any scene layers of the multilayer scene (i.e., background layer, subject layer, or actor layer). Some objects can be interacted with by the at least one actor. These are referred to as interactive objects. An interactive object is a virtual object depicted in a scene within at least one of the multiple layers that composes the multilayer scene. An interactive object, as described herein, is a virtual object placed or created in a scene that is independent (i.e., is separable from the actor) from the actor and with which interaction triggers some action such as a visual state change. In terms of interaction among the subject, object, or actors portrayed in the layers of a scene, the interactive objects include a whole or at least a portion of the actor images themselves. For example, when there are virtual interactions between the two actors in a scene, such interactions are established using a similar manner where the third-party actor(s) (i.e., the other actor(s) to the one actor) is treated as an object.

Figure 10:
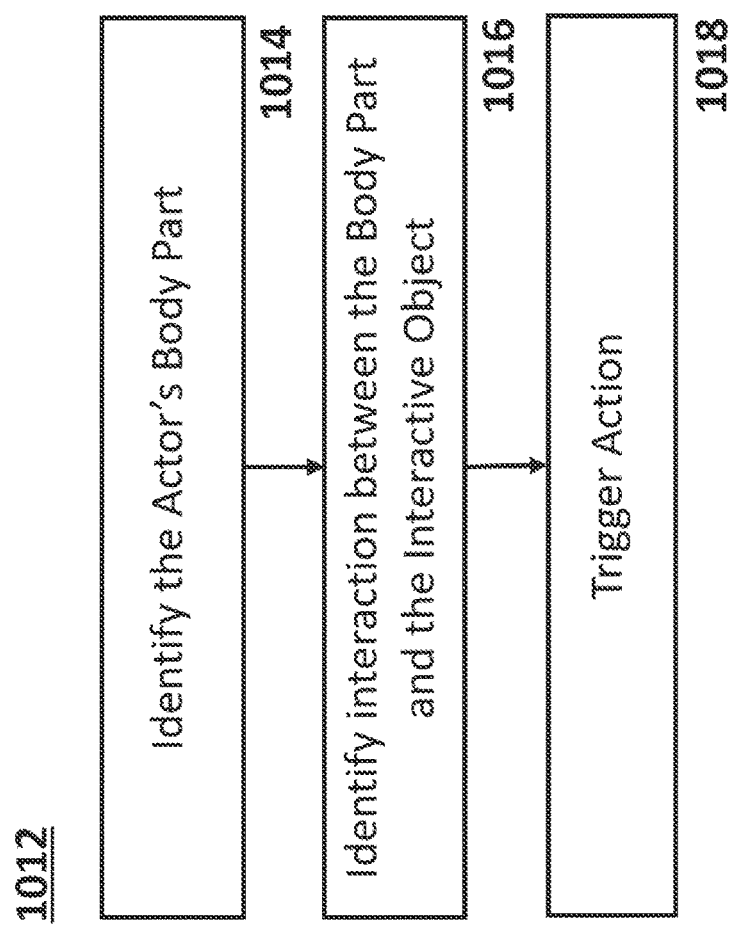
FIGS. 10 and 11 illustrate example implementations of the actor interacting with an interactive object, according to the system and method of the present disclosure.
Figure 10:
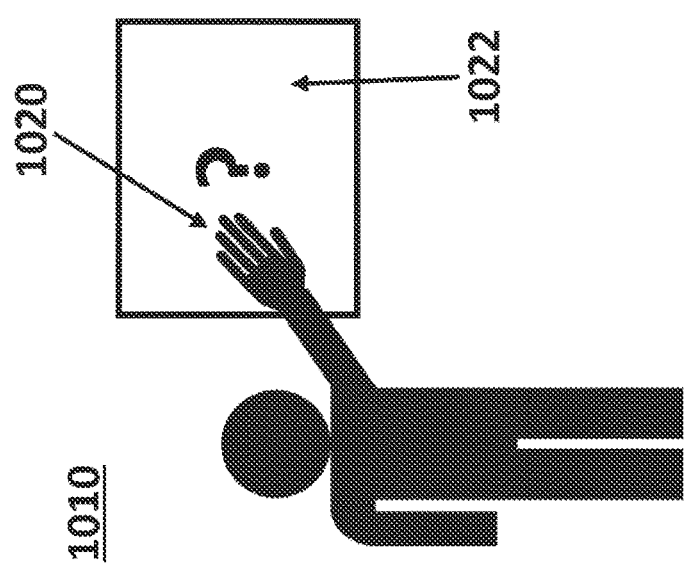

In some examples, recognition of the movements or motions of the actor is used to cause interaction with the interactive object. The recognition of the motion or movement of the actor can be done using video recognition approaches, such as You Only Look Once (YOLO), a real-time object detection method, human pose estimation (including based on skeletal-based, contour-based, and/or volume-based models, and the like. Similarly, the actor's body part (hand, foot, head, etc.) can be tracked by object recognition approaches such as YOLO, human pose estimation (including based on skeletal-based, contour-based, and/or volume-based models), etc. As shown in FIG. 10, when the location of an actor's body part 1020 in the scene 1010 overlaps with the interactive object 1022, an action is triggered. An action in this context refers to certain visible or audible changes within the scene displayed in the display unit. The triggered action may be a display of certain animation, providing a certain sound, and the like. In some examples, the interaction causes such action to take place where a change in the visual state of the interactive object (and/or the actor image itself) is observed from the scene. Examples of such changes include certain prescribed animation, movement, change in color, deformation, change in state, and the like. The process 1012 demonstrates the process of actor interaction-caused action. At step 1014, the system identifies a certain actor's body part that is assigned to be in interaction with the interactive object. Once the actor's body part 1020 (in this example, a hand), within the output video or a scene therefrom, interacts with the interactive object 1022 by making contact with the interactive object 1020 (i.e., the actor's body part 1020 is overlapping, at least partially, with the interactive object 1022, the interaction between the body part and the interactive object 1022 is identified at step 1016. In response to which, an action is triggered by the system at 1018. In some examples, an interaction between the actor and the interactive object can be presented, using the display unit, with the video or the image of the physical actor (e.g., the actual game player sensed by the imaging unit) being presented within the composite video output. Such graphical representation of the actor enhances the user's experience of this feature, for example in a video game setting. Gesture-induced action of FIG. 8 also is a type of triggered action. As described in FIG. 8, gesture changes (in this example, a pose change) of the actor 802 from a standing pose to a running gesture by the actor resulted in the actor on the scene to cause an action of the actor in the scene to run 804. The imaging unit 102 captures the actor, the game player, taking a gesture. The data acquisition unit 104 then acquires such information, in response to which the control unit 108 causes the actor within the scene to take the corresponding action. In the examples demonstrated in FIG. 8, an interactive object is not taking part in the gesture-induced action.

Figure 11:
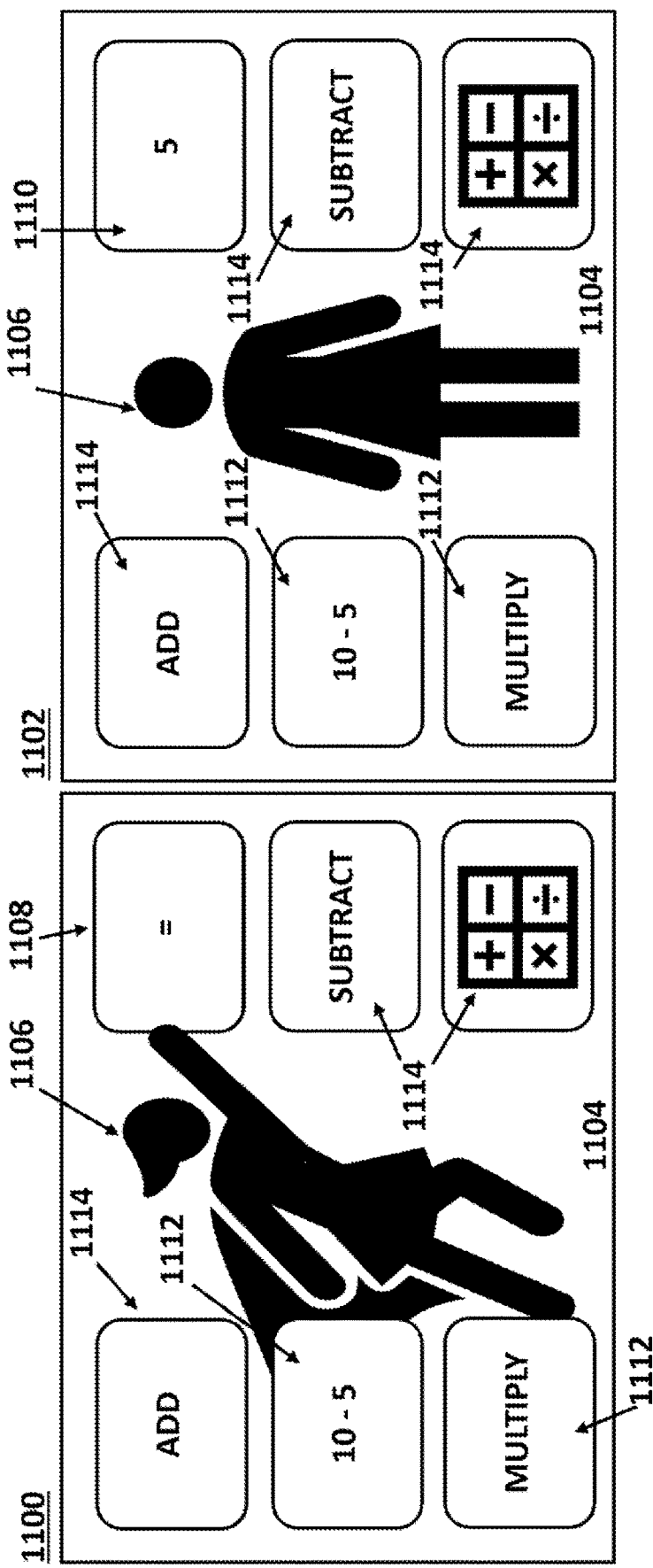

In some examples, such interaction feature can be used by the actor to trigger an animation in a presentation slide from software such as Powerpoint or Google Slides. In some examples, a student (i.e., the actor) in a virtual classroom (i.e., the scene) can virtually touch a virtual flashcard (i.e., the interactive object) to cause it to flip over (i.e., the triggered or caused action). In some examples, the action is a change in some other state, such as the increasing of a score in a video game. Obviously, many different types of objects and actions may be combined. An exemplary interaction is demonstrated in FIG. 11. In the scene 1100, a multilayer scene, captured in FIG. 11, the actor 1106 is interacting with an interactive object 1108 within the scene. The actor 1106 is positioned on the actor layer between the subject layer and the background layer 1104 in this multilayer scene 1100. In scene 1100, the actor 1106 can interact with the interactive objects of the subject layer and the background layer, such as 1108 1114 1112. In this scene 1100, the interactive objects (or also referred to as subjects of the subject layer) 1112 are positioned (i.e., position of depth with respect to the stacked layers in a scene) in the subject layer, while the interactive objects 1108 and 1114 are positioned in the background layer, where all objects in this scene are interactable by the actor. In one example, the interaction can be an action, such as pointing a finger at the interactive object, thus triggering an action. This is an example of gesture-based interaction where the body part of the actor (the finger in this example) is identified to have certain gesture detected. Such gesture is detected by the system using the imaging unit. Alternatively, similar to the example implementation demonstrated in FIG. 10, the actor's body part making contact with (and therefore interaction with) or overlapping with the interactive object 1108 can trigger an action to be taken by the interactive object 1108. This is an example of contact-based interaction. Other example includes proximity-based interaction where the actor getting closer to the interactive object above a certain threshold distance causes the action to be demonstrated by the interactive object. At scene 1102, an action is triggered. In this example, a calculating function is triggered, and graphical presentation of the calculated result is the action. A change in the visual state of the interactive object is observed from 1108 to 1110 in the scene. As shown in FIG. 11, the system and method of the present disclosure can be applied in an educational setting to enhance the student's learning ability by adding an interactive element to the learning process.

By way of an example, the actor can make a swiping motion with their hand from left to right to advance the scene to the next scene in a presentation or right to left to change the scene to the previous slide. Likewise, in another example, the actor can form a gesture with their hand mimicking the holding of a writing instrument. The recognition of this gesture then triggers drawing onto virtual space of the slide in the scene as if the actor were holding a virtual writing instrument. In a gaming example, the actor's gestures may be recognized and used to trigger actions such as running, jumping, throwing a virtual basketball, swinging a virtual golf club, or casting a magic spell, stepping on an interactive object, kicking, pulling, punching, and the like. These and other application of the presently disclosed system and method can be realized to enhance a user's experience of the intended purpose of the video-enabled interactive exercise.

In some examples, more than one actor may be involved. One actor may be able to interact with another actor; two or more actors may be able to collaboratively interact with an interactive object; and two or more actors may be able to each interact with various interactive objects. For example, in one embodiment (such as a video game), the hand of a first actor may be used to virtually hit a second actor. In this interaction, the first actor's gesture of 'hitting' is an interaction with the second actor where the second actor is treated as an interactive object. Upon the first actor making virtual contact with the second actor, an action is triggered such as the moving, deforming, or changing the color, of the interactive object (i.e., a change in the visual state) which is the second actor. For example, a gesture that can be used to interact with interactive objects includes punching, kicking, karate-chopping, pressing, tapping, grasping, twisting, stomping, jumping, lunging, pulling, pushing, lifting, dropping, throwing, eating, drinking, and the like.

Just as actors can interact with each other, so too can an object controlled by an actor interact with other objects (including other actors). By way of an example, the actor holds a toy sword (or toy light saber) which can interact with interactive objects on the output video. In some examples, the actor holds a virtual weapon (accomplished through application of gesture recognition and augmented reality approaches) which can interact with the interactive object, including other actors or other actor's swords (whether the sword is virtual or physical, and whether the actor is physically located in the same space or remote location). Non-limiting examples of actor-controlled objects include virtual weapons, such as hand-to-hand combat weapons, swords and light sabers and projectile weapons such as guns and snowballs. In an education application, such actor-controlled objects include writing instruments, a pointing device, and the like.

In some examples, the actor uses an item such as a remote-control device to trigger an action in the scene. Such remote-control devices include, but are not limited to, remote slide advancers, video gaming controllers, toy light sabers, toy guns, etc. In some examples, the actor uses speech or sound to trigger an action in the scene. Specifically, the actor can say "next slide" to trigger the action of changing the scene or triggering an action from one slide to the next in a presentation and, similarly, "previous slide" to trigger the action of changing the scene from one slide to the previous slide in a presentation.

Figure 12:
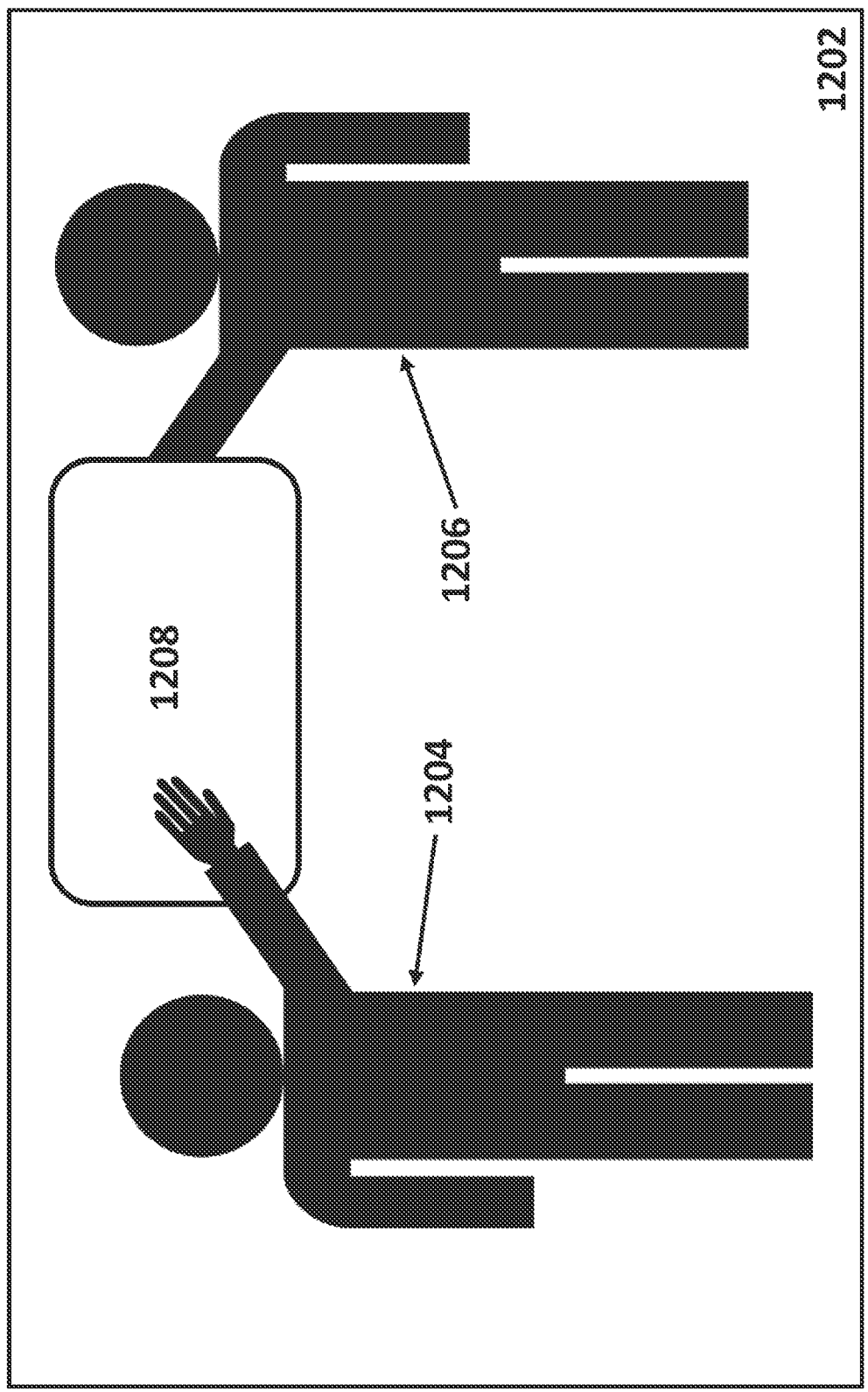
FIG. 12 illustrates an example implementation of multiple actors interacting with an interactive object, according to the system and method of the present disclosure.

As illustrated in FIG. 12, two or more actors may interact with the same interactive object in a virtual space. In this scene of FIG. 12, the two actors, the first actor 1204 and the second actor 1206 are visualized ahead of the background layer 1202. The scene in FIG. 12 presents a virtual interaction between the two actors 1204 1206 displayed in the output video or visualized in this multilayer scene. The interactions, in this example, are shown as both actors 1204 1206 making contact with or overlapping with the interactive object 1208. The action to be triggered by such an interaction is only triggered when the interaction is completed simultaneously by the two actors or completed by both of the actors 1204 1206. In this example, the layers of the multilayer scene include the background layer 1202 positioned behind all other layers, the second actor layer in front of the background layer, the interactive object layer positioned in front of the second actor layer, then the first actor layer positioned in front of the interactive object layer.

As demonstrated, FIG. 12 illustrates total of four different layers in display including two actor layers.

In some examples, a plurality of actors can be included in the same actor layer. In some examples, a single actor layer can depict a plurality of actors when more than one actors are physically in the same space in front of the same imaging unit. Upon isolating their actor images, they are included in the same actor layer. In other examples, a single actor layer can depict a plurality of actors when the plurality of actors are physically apart in front of different imaging units. Upon isolating their actor images, the actor images are inserted into the same actor layer.

As explained above and reiterated below, the present disclosure includes, without limitation, the following example implementations.

Clause 1. A computer-implemented method for generating a multilayer scene, the method comprising: receiving a video stream data of an actor, using an imaging unit, wherein the video stream data captures the actor at least partially; isolating the actor from the video stream data, wherein the isolated actor is positioned at an actor layer of the multilayer scene; identifying at least two layers of images from one or more input data, wherein the at least two layers of images are positioned at two different depth positions within the multilayer scene; and displaying the multilayer scene on a display unit, wherein the multilayer scene comprises the actor layer positioned in front of one of the at least two layers of images and behind the other one of the at least two layers of images.

Clause 2. The method of clause 1, wherein the step of identifying at least two layers of images includes receiving a multilayer input data as the one or more input data, the multilayer input data including the at least two layers of images.

Clause 3. The method of clause 1, wherein the step of identifying at least two layers of images includes receiving a composite input data as the one or more input data, the at least two layers of images being extracted from the composite input data.

Clause 4. The method of clause 1, wherein the step of identifying at least two layers of images includes identifying a first region and a second region from one of the at least two layers of images, the first region and the second region being positioned at two different depth positions within the multilayer scene.

Clause 5. The method of clause 1, wherein the step of isolating the actor from the video stream data includes positioning the isolated actor at a predetermined depth position within the actor layer.

Clause 6. The method of clause 1 further comprising the step of determining depth positions of the identified at least two layers of images within the multilayer scene, wherein each of the depth positions are selected between in front of or behind the actor layer.

Clause 7. The method of clause 6, wherein the depth positions of the identified at least two layers of images within the multilayer scene are determined based on a feature present on each of the at least two layers of images.

Clause 8. The method of clause 7, wherein the feature is at least one of, content, keyword, data type, colors, size, or shape.

Clause 9. The method of clause 1 further comprising the steps of:

receiving a second video stream data of a second actor, using the imaging unit, wherein the second video stream data captures the second actor at least partially; and isolating the second actor from the second video stream data, wherein the isolated second actor is positioned at the actor layer of the multilayer scene.

Clause 10. The method of clause 9, wherein the actor layer includes two layers in which the isolated first actor and the isolated second actor are positioned separately in the two layers.

Clause 11. The method of clause 1 further comprising the step of identifying a gesture of the actor from the video stream data, wherein the identified gesture causes an action to be exercised by the isolated actor displayed on the multilayer scene.

Clause 12. The method of clause 1 further comprising the step of identifying an interactive object from the one or more input data, wherein the actor interacts with the interactive object by causing the isolated actor displayed on the multilayer scene to interact with the interactive object.

Clause 13. The method of clause 12, wherein a visual state change is triggered in response to the isolated actor interacting with the interactive object, the visual state change including visual change in a region of the multilayer scene corresponding to the interactive object.

Clause 14. The method of clause 13 further comprising the step of determining that the isolated actor is interacting with the interactive object by identifying the isolated actor within the actor layer overlapping with the region of the multilayer scene corresponding to the interactive object.

Clause 15. The method of clause 13 further comprising the step of determining that the isolated actor is interacting with the interactive object by identifying a gesture of the actor from the video stream data.

Clause 16. A system for generating a multilayer scene, comprising: an imaging unit capturing a video stream data of an actor at least partially; a storage unit having a computer-readable program code stored therein; and a processor, in communication with the storage unit, configured to execute the computer-readable program code to cause the system to at least: receive the video stream data of the actor from the imaging unit; isolate the actor from the video stream data, wherein the isolated actor is positioned at an actor layer of the multilayer scene; identify at least two layers of images from one or more input data, wherein the at least two layers of images are positioned at two different depth positions within the multilayer scene; and display the multilayer scene on a display unit, wherein the multilayer scene comprises the actor layer positioned in front of one of the at least two layers of images and behind the other one of the at least two layers of images.

Clause 17. The system of clause 16, wherein the one or more input data is a multilayer input data, the multilayer input data including the at least two layers of images.

Clause 18. The system of clause 16, wherein the one or more input data is a composite input data, the at least two layers of images being extracted from the composite input data by the processor.

Clause 19. The system of clause 16, wherein the processor is configured to execute the computer-readable program code to cause the system to further identify a first region and a second region from one of the at least two layers of images, the first region and the second region being positioned at two different depth positions within the multilayer scene.

Clause 20. The system of clause 16, wherein the isolated actor is positioned at a predetermined depth position within the actor layer.

Clause 21. The system of clause 16, wherein the processor is configured to execute the computer-readable program code to cause the system to further determine depth positions of the identified at least two layers of images within the multilayer scene, wherein each of the depth positions are selected between in front of or behind the actor layer.

Clause 22. The system of clause 21, wherein the depth positions are determined based on a feature present on each of the at least two layers of images.

Clause 23. The system of clause 22, wherein the feature is at least one of, content, keyword, data type, colors, size, or shape.

Clause 24. The system of clause 16, wherein the processor is configured to execute the computer-readable program code to cause the system to further: receive a second video stream data of a second actor, using the imaging unit, wherein the second video stream data captures the second actor at least partially; and isolate the second actor from the second video stream data, wherein the isolated second actor is positioned at a layer of the multilayer scene that is different from the actor layer.

Clause 25. The system of clause 24 wherein the actor layer includes two layers in which the first actor and the second actor is positioned separately between the two layers.

Clause 26. The system of clause 16, wherein the processor is configured to execute the computer-readable program code to cause the system to further identify a gesture of the actor from the video stream data, wherein the identified gesture causes an action to be exercised by the isolated actor displayed on the multilayer scene.

Clause 27. The system of clause 16, wherein the processor is configured to execute the computer-readable program code to cause the system to further identify an interactive object from the one or more input data, wherein the actor interacts with the interactive object by causing the isolated actor displayed on the multilayer scene to interact with the interactive object.

Clause 28. The system of clause 27, wherein a visual state change is triggered in response to the isolated actor interacting with the interactive object, the visual state change including visual change in a region of the multilayer scene corresponding to the interactive object.

Clause 29. The system of clause 28, wherein the processor is configured to execute the computer-readable program code to cause the system to further determine that the isolated actor is interacting with the interactive object by identifying the isolated actor within the actor layer overlapping with the region of the multilayer scene corresponding to the interactive object.

Clause 30. The system of clause 28, wherein the processor is configured to execute the computer-readable program code to cause the system to further determine that the isolated actor is interacting with the interactive object by identifying a gesture of the actor from the video stream data.

Clause 31. A computer-readable storage medium for generating a multilayer scene, the computer-readable storage medium being non-transitory and having computer-readable program code stored therein that, in response to execution by processing circuitry, causes an apparatus to at least: receive a video stream data of an actor, using an imaging unit, wherein the video stream data captures the actor at least partially; isolate the actor from the video stream data, wherein the isolated actor is positioned at an actor layer of the multilayer scene; identify at least two layers of images from one or more input data, wherein the at least two layers of images are positioned at two different depth positions within the multilayer scene; and display the multilayer scene on a display unit, wherein the multilayer scene comprises the actor layer positioned in front of one of the at least two layers of images and behind the other one of the at least two layers of images.

Clause 32. The computer-readable storage medium of clause 31, wherein the one or more input data is a multilayer input data, the multilayer input data including the at least two layers of images.

Clause 33. The computer-readable storage medium of clause 31, wherein the one or more input data is a composite input data, the at least two layers of images being extracted from the composite input data.

Clause 34. The computer-readable storage medium of clause 31, wherein the computer-readable storage medium causes the apparatus to further identify a first region and a second region from one of the at least two layers of images, the first region and the second region being positioned at two different depth positions within the multilayer scene.

Clause 35. The computer-readable storage medium of clause 31, wherein the isolated actor is positioned at a predetermined depth position within the actor layer.

Clause 36. The computer-readable storage medium of clause 31, wherein the computer-readable storage medium causes the apparatus to further determine depth positions of the identified at least two layers of images within the multilayer scene, wherein each of the depth positions are selected between in front of or behind the actor layer.

Clause 37. The computer-readable storage medium of clause 36, wherein the depth positions are determined based on a feature present on each of the at least two layers of images.

Clause 38. The computer-readable storage medium of clause 37, wherein the feature is at least one of, content, keyword, data type, colors, size, or shape.

Clause 39. The computer-readable storage medium of clause 31, wherein the computer-readable storage medium causes the apparatus to further: receive a second video stream data of a second actor, using the imaging unit, wherein the second video stream data captures the second actor at least partially; and isolate the second actor from the second video stream data, wherein the isolated second actor is positioned at a layer of the multilayer scene that is different from the actor layer.

Clause 40. The computer-readable storage medium of clause 39 wherein the actor layer includes two layers in which the first actor and the second actor is positioned separately between the two layers.

Clause 41. The computer-readable storage medium of clause 31, wherein the computer-readable storage medium causes the apparatus to further identify a gesture of the actor from the video stream data, wherein the identified gesture causes an action to be exercised by the isolated actor displayed on the multilayer scene.

Clause 42. The computer-readable storage medium of clause 31, wherein the computer-readable storage medium causes the apparatus to further identify an interactive object from the one or more input data, wherein the actor interacts with the interactive object by causing the isolated actor displayed on the multilayer scene to interact with the interactive object.

Clause 43. The computer-readable storage medium of clause 42, wherein a visual state change is triggered in response to the isolated actor interacting with the interactive object, the visual state change including visual change in a region of the multilayer scene corresponding to the interactive object.

Clause 44. The computer-readable storage medium of clause 43, wherein the computer-readable storage medium causes the apparatus to further determine that the isolated actor is interacting with the interactive object by identifying the isolated actor within the actor layer overlapping with the region of the multilayer scene corresponding to the interactive object.

Clause 45. The computer-readable storage medium of clause 43, wherein the computer-readable storage medium causes the apparatus to further determine that the isolated actor is interacting with the interactive object by identifying a gesture of the actor from the video stream data While several variations of the present disclosure have been illustrated by way of example in particular description, it is apparent that further examples can be developed within the spirit and scope of the present disclosure, or the inventive concept thereof. Those skilled in the art will readily observe that numerous modifications, applications, variations, and alterations of the device and method may be made while retaining the teachings of the present disclosure. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for generating a multilayer scene, the method comprising:
  receiving a video stream data of an actor, using an imaging unit, wherein the video stream data captures the actor at least partially;
  isolating the actor from the video stream data, wherein the isolated actor is positioned at an actor layer of the multilayer scene;
  receiving at least two layers of images from one or more input data, wherein the at least two layers of images are positioned at two different depth positions within the multilayer scene, the one or more input data includes data associated with an interactive object, wherein the actor interacts with the interactive object within the multilayer scene by causing the isolated actor on the multilayer scene to interact with the interactive object; and
  displaying the multilayer scene on a display unit, wherein the multilayer scene comprises the actor layer positioned in front of one of the at least two layers of images and behind the other one of the at least two layers of images.

2. The method of claim 1, wherein the step of receiving at least two layers of images includes receiving a multilayer input data as the one or more input data, the multilayer input data including the at least two layers of images.

3. The method of claim 1, wherein the step of receiving at least two layers of images includes receiving a composite input data as the one or more input data, the at least two layers of images being extracted from the composite input data.

4. The method of claim 1, wherein the step of receiving at least two layers of images includes identifying a first region and a second region from one of the at least two layers of images, the first region and the second region being positioned at two different depth positions within the multilayer scene.

5. The method of claim 1, wherein the step of isolating the actor from the video stream data includes positioning the isolated actor at a predetermined depth position within the actor layer.

6. The method of claim 1 further comprising the step of determining the depth positions of the at least two layers of images within the multilayer scene, wherein each of the depth positions are selected between positions in front of or behind the actor layer.

7. The method of claim 6, wherein the depth positions of the at least two layers of images within the multilayer scene are determined based on identifying presence or non-presence of a feature present on each of the at least two layers of images.

8. The method of claim 7, wherein the feature is at least one of, content, keyword, data type, colors, size, or shape.

9. The method of claim 1 further comprising the steps of:
  receiving a second video stream data of a second actor, using the imaging unit, wherein the second video stream data captures the second actor at least partially; and
  isolating the second actor from the second video stream data, wherein the isolated second actor is positioned at the actor layer of the multilayer scene.

10. The method of claim 1 further comprising the step of identifying a gesture of the actor from the video stream data, wherein the identified gesture causes an action to be exercised by the isolated actor displayed on the multilayer scene, the action changes position of the isolated actor.

11. The method of claim 1 further comprising the step of displaying a visual state change to the interactive object on the display unit, wherein the visual state change is triggered in response to the isolated actor interacting with the interactive object, the visual state change including visual change in a region of the multilayer scene corresponding to the interactive object.

12. The method of claim 11 further comprising the step of determining that the isolated actor is interacting with the interactive object by identifying a gesture of the actor from the video stream data.

13. The method of claim 1 further comprising the step of determining that the isolated actor is interacting with the interactive object, in the multilayer scene, by identifying the isolated actor within the actor layer contacting a region of the multilayer scene corresponding to the interactive object.

14. A system for generating a multilayer scene, comprising:
  an imaging unit capturing a video stream data of an actor at least partially;
  a storage unit having a computer-readable program code stored therein; and
  a processor, in communication with the storage unit, configured to execute the computer-readable program code to cause the system to at least:

receive the video stream data of the actor from the imaging unit;

isolate the actor from the video stream data, wherein the isolated actor is positioned at an actor layer of the multilayer scene;

receive at least two layers of images from one or more input data, wherein the at least two layers of images are positioned at two different depth positions within the multilayer scene, the one or more input data includes data associated with an interactive object, wherein the actor interacts with the interactive object within the multilayer scene by causing the isolated actor on the multilayer scene to interact with the interactive object; and display the multilayer scene on a display unit, wherein the multilayer scene comprises the actor layer positioned in front of one of the at least two layers of images and behind the other one of the at least two layers of images.

15. The system of claim 14, wherein the processor is configured to execute the computer-readable program code to cause the system to further identify a first region and a second region from one of the at least two layers of images, the first region and the second region being positioned at two different depth positions within the multilayer scene.

16. The system of claim 14, wherein the processor is configured to execute the computer-readable program code to cause the system to further determine depth positions of the at least two layers of images within the multilayer scene, wherein each of the depth positions are selected between in front of or behind the actor layer.

17. The system of claim 16, wherein the depth positions are determined based on identifying presence or non-presence of a feature on each of the at least two layers of images.

18. The system of claim 14, wherein the processor is configured to execute the computer-readable program code to cause the system to further determine that the isolated actor is interacting with the interactive object, in the multilayer scene, by identifying the isolated actor within the actor layer contacting a region of the multilayer scene corresponding to the interactive object.

19. The system of claim 14, wherein the processor is configured to execute the computer-readable program code to cause the system to further identify a gesture of the actor from the video stream data, wherein the identified gesture causes an action to be exercised by the isolated actor displayed on the multilayer scene, the action changes position of the isolated actor.

20. A computer-implemented method for generating a multilayer scene, the method comprising:

receiving a video stream data of an actor, using an imaging unit, wherein the video stream data captures the actor at least partially;

isolating the actor from the video stream data, wherein the isolated actor is positioned at an actor layer of the multilayer scene;

receiving at least two layers of images from one or more input data, wherein the at least two layers of images are positioned at two different depth positions within the multilayer scene;

displaying the multilayer scene on a display unit, wherein the multilayer scene comprises the actor layer positioned in front of one of the at least two layers of images and behind the other one of the at least two layers of images; and identifying a gesture of the actor from the video stream data, wherein the identified gesture causes an action to be exercised by the isolated actor displayed on the multilayer scene, the action changes position of the isolated actor.

* * * * *